2,969,856

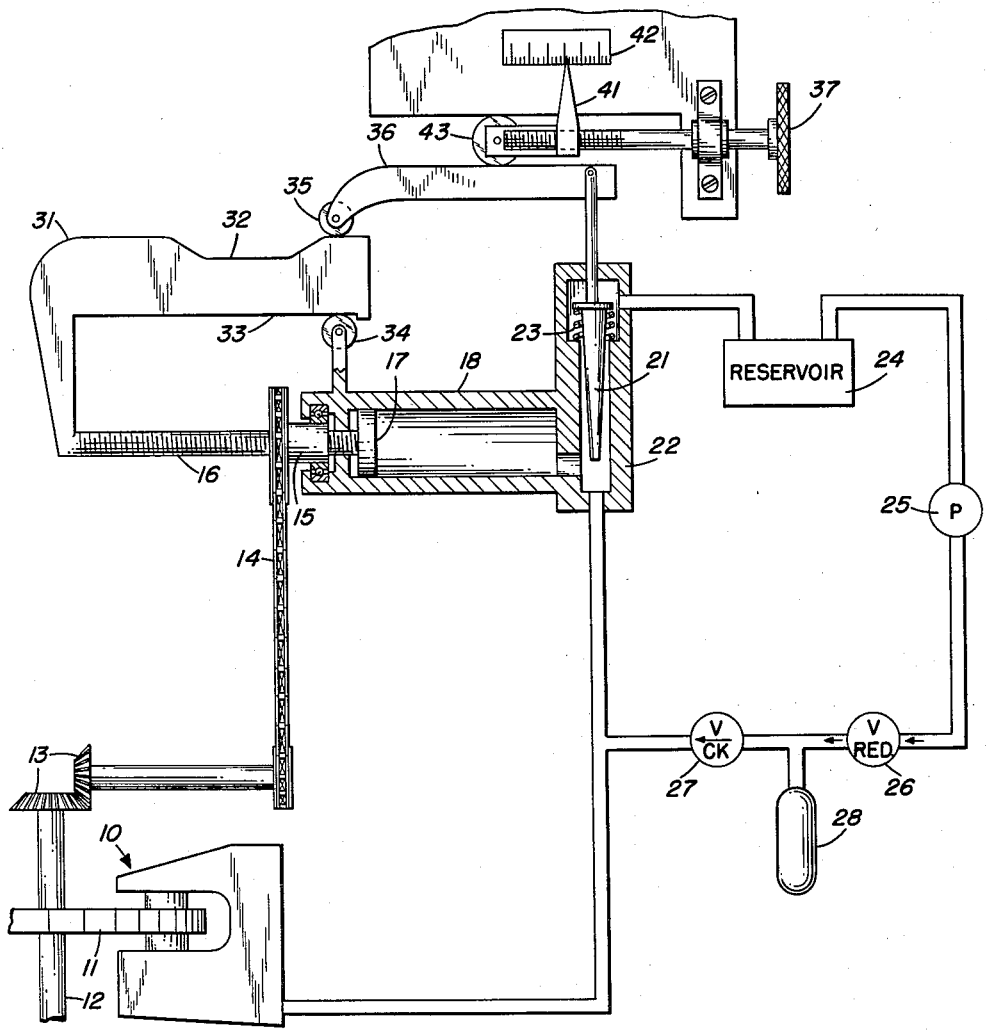

VELOCITY SENSITIVE RUNOUT BRAKE CONTROL SYSTEM

Joseph W. Dow, Kingsville, Md., assignor, by mesne assignments, to the United States of America as represented by the Secretary of the Navy Filed Apr. 30, 1959, Ser. No. 810,198

2 Claims. (Cl. 188—110)

The present invention relates to a velocity sensitive runout control system and more particularly to a control system for controlling a friction arresting gear for arresting aircraft on flight decks or on airfields of a comparatively short length.

Arresting engine controls are designed to arrest an aircraft under specified conditions of weight and velocity. With any arresting gear it is desirable that the decelerating load on the aircraft remain as constant as possible through the entire runout. The constant load thereby requires the minimum decelerating load throughout the travel for the conditions of the landing airplane and also enables the ground handling screw to be in a position giving them the shortest distance to reach the aircraft so that it may be removed and the gear made ready for the next arrestment. The geometry of the arresting cable changes as the cable is pulled out so as to increase the mechanical advantage of the arresting gear to the airplane. This additional brakepower prevented a constant decelerating force from being applied.

The present invention is developed to program the runout brake pressure in such a manner as to give the desirable constant load and runout and is based on the principle of utilizing part of the energy of the aircraft to apply the brakes. Programming the runout control is performed so that a change in velocity of the brake drums and the aircraft from a desired velocity at any point in the travel will increase or decrease the brake pressure in order to bring the velocity to that which is desired.

An object of the present invention is to provide an arresting gear having means of compensating for aircraft of specified weight and landing velocity.

Another object is to provide an arresting gear having adjustment means for applying a constant brake pressure over the entire runout of an aircraft.

A further object of the invention is the provision of an arresting gear which uses some of the energy of the airplane being arrested to provide the braking pressure.

A final object of the invention is to provide an arresting gear operable hydraulically for arresting an aircraft with a constant decelerating load and a constant runout.

Other objects and many of the attendant advantages of this invention will be readily appreciated as the same becomes better understood by reference to the following detailed description when considered in connection with the accompanying sheet of drawing wherein the single figure shows a diagrammatic sketch with portions in section of the hydraulic brake system of the arrester.

Referring now to the drawing, there is shown in the figure a hydraulic system containing a brake assembly designated generally at 10. The cables (not shown) drive the brake disc 11 mounted on shaft 12. Through some suitable means, such as bevel gears 13 and a series of drive chains 14, the shaft 12 is adapated to rotate a screw jack 15 having a threaded shaft 16 for a purpose to be described hereinafter. A piston 17 is affixed to one end of the shaft 16 which acts within a cylinder 18. Connected to cylinder 18 is an orifice valve 21 for controlling the flow through the hydraulic circuit. This has a valve body 22 and a return spring 23. The remaining portion of the circuit consists of a reservoir 24, a pump and motor 25, a pressure control valve 26, check valve 27 and an accumulator 28. Mounted on the opposite end of the shaft 16 is a fulcrum arm 31 having a cammed upper surface 32 and a flat lower surface 33. Rollers 34, 35 are attached to the cylinder 18 and an arm 36 respectively and are adapted to roll along the surface of the fulcrum arm 31. A manual selector control 37 having a pointer 41 and indicating means 42 is provided with a roller 43 on the end thereof to proceed along the upper surface of arm 36.

The operation of the hydraulic system is as follows: The cable system is maintained at a low pretension load when the arresting cable (not shown) is ready for an arrestment. This assures that the system is tight and will not start out with some portions of it being snatched. It is also necessary to reduce the brake pressure rapidly near the end of runout in order to prevent the high deceleration which occurs at the moment of stopping, when static friction replaces the lower sliding friction. The pretension pressure on the brake assembly 10 which holds the cable in a taut position is produced by the flow of a pump 25 through an orifice valve 21. A pressure control valve 26 in the circuit with an accumulator 28 keeps the fluid pressure constant and a check valve 27 prevents the escape of the higher brake pressure during runout.

When an aircraft engages the cable, the resulting pull-out of the cable rotates the brake shaft 12 and the brake disc 11, driving the chain 14 by connecting bevel gears 13. The chain 14, in turn, rotates screw jack 15 and thereby drives the piston 17. The piston 17, acting in the fluid-filled cylinder 18 displaces fluid through a cam controlled orifice valve 21. The orifice valve 21 is arranged to be in a normally closed down position by virtue of the arm 36 affixed to the upper end thereof. When the orifice valve 21 is closed down, the back pressure from the pump flow is applied to the brake assembly 10. As soon as this back pressure exceeds the pretension brake pressure, check valve 27 closes and prevents the loss through the pretension circuit. The flow through the orifice 21 during runout is proportional to the speed and the control system therefore is velocity sensitive.

The programming of the control system is done by means of a cam formed in the curved upper surface 32 of fulcrum arm 31. This arm 31 is driven by the screw jack 15 which also drives the control cylinder piston 17. The cam is shaped to apply a braking load on an aircraft which will decelerate it in the most efficient manner without exceeding the maximum allowable load. Since the flow from the cylinder 18 and the mechanical advantage of the brake 10 to the aircraft are continually changing, the opening of orifice valve 21 must also change. The cam surface 32 is shaped as nearly as practical to control the orifice opening in a manner which will produce the optimum brake pressure to cause the airplane to follow a predetermined ideal velocity pattern at any point of runout. If the load is not at predetermined velocity for that point, the flow is reduced although the orifice opening is the same. The result of this, of course is a lower brake pressure and a reduction of the decelerating load. If the velocity is greater than expected for this point, the opposite effect is produced.

When the aircraft has decelerated to the point where the control cylinder 18 no longer displaces enough fluid through the orifice valve 21 to maintain a back pressure equal to that of the pretension brake circuit, the check valve 27 opens and admits the flow from the pump 25 to maintain the pretension brake pressure. This brings the aircraft to its final stop with a low brake pressure and prevents a rise in friction coefficient from producing high loads as the system comes to a stop.

Since the optimum brake load for any aircraft is proportional to its weight, provision is made to allow the operator to select the proper brake pressure by aircraft weight. Operation of the manual weight selector 37 changes the fulcrum point of the cam lever by movement of roller 43 on arm 36. This, in turn, changes the ratio of the travel of the orifice valve 21 to the travel of the upper surface 32 of arm 31 and therefore varies the orifice area in valve 21 in proportion to cam travel. The lighter aircraft require larger changes in area during runout, which therefore requires a greater needle travel for the same cam displacement.

Obviously many modifications and variations of the present invention are possible in the light of the above teachings. It is therefore to be understood, that within the scope of the appended claims, the invention may be practiced otherwise than as specifically described.

What is claimed is:

1. In a mechanism for arresting a landing aircraft with arresting gear comprising, brake means and adjustable fulcrum means, said brake means having a hydraulic system with an adjustable fluid pressure means operatively connected thereto, said adjustable fulcrum means operatively connected to said fluid pressure means for selecting the proper brake pressure for any given aircraft, said fluid pressure means having a cylinder and a piston therein, said piston operatively connected to said brake means, said cylinder having an orifice at its one end to permit the discharge of fluid therefrom, cam means operatively connected to said piston which moves an amount equal to the travel of said piston, an orifice valve mounted in said orifice to control the flow of fluid flowing therethrough, an arm having a roller on one end which rides on said cam means and the other end of said arm is connected to said orifice valve for adjusting the position of said orifice valve, said adjustable fulcrum means having a movable roller which is in rolling contact with said arm and varies the fulcrum point about which said arm pivots when the position of said roller is changed, whereby the amount of fluid pressure applied to said brake is proportional to the movement of said arm on said cam, the setting of said adjustable fulcrum means and the velocity of said piston.

2. In a mechanism for arresting a landing aircraft with arresting gear comprising, brake means and an adjustable fulcrum means, said brake means having a hydraulic system with an adjustable fluid pressure means operatively connected thereto, said adjustable fulcrum means having a movable roller operatively connected to one end of a selector control shaft, a selector control knob connected to the other end of the selector control shaft, said selector control shaft being threaded and capable of axial movement upon rotation of said selector control knob whereby the proper brake pressure for any given aircraft may be selected, said fluid pressure means having a cylinder and a piston reciprocable therein, said piston fixedly secured to one end of a threaded shaft, a screw jack threadedly engaging said threaded shaft, said screw jack being driven through a chainbelt which is operatively connected to said brake means, said cylinder having an orifice at its one end to permit the discharge of fluid therefrom, an orifice valve mounted in said orifice to control the flow of fluid flowing therethrough, cam means operatively connected to the other end of said threaded shaft whereby said cam means moves an amount equal to the travel of said piston, an arm having a roller on one end which rides on said cam means, the other end of said arm is connected to said orifice valve for adjusting the position of said orifice valve, said movable roller being in rolling contact with said arm and varying the fulcrum point about which said arm pivots when the position of said roller is changed, whereby the amount of fluid pressure applied to said brake is proportional to the movement of said arm on said cam, the setting of said adjustable fulcrum means and the velocity of said piston.

References Cited in the file of this patent

UNITED STATES PATENTS

| | | |
|---|---|---|
| 2,731,219 | Cotton et al. | Jan. 17, 1956 |
| 2,843,228 | Wysor | July 15, 1958 |
| 2,860,732 | Snow | Nov. 18, 1958 |